(12) United States Patent
Saitoh et al.

(10) Patent No.: US 7,956,675 B2
(45) Date of Patent: Jun. 7, 2011

(54) CONTROL CIRCUIT AND CONTROL METHOD FOR CHARGE PUMP CIRCUIT

(75) Inventors: Shinichi Saitoh, Kyoto (JP); Yo Yamashiro, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 12/555,792

(22) Filed: Sep. 8, 2009

(65) Prior Publication Data

US 2010/0060343 A1 Mar. 11, 2010

(30) Foreign Application Priority Data

Sep. 8, 2008 (JP) .................................. 2008-230299

(51) Int. Cl.
*G05F 1/10* (2006.01)
(52) U.S. Cl. .......................................... 327/536; 363/60
(58) Field of Classification Search .................. 327/536; 363/59–60
See application file for complete search history.

(56) References Cited

U.S. PATENT DOCUMENTS

| | | | | |
|---|---|---|---|---|
| 5,553,030 A | * | 9/1996 | Tedrow et al. ................. | 365/226 |
| 5,561,385 A | * | 10/1996 | Choi .............................. | 327/536 |
| 5,748,050 A | * | 5/1998 | Anderson ....................... | 331/57 |
| 5,818,766 A | * | 10/1998 | Song .......................... | 365/189.11 |
| 6,049,201 A | * | 4/2000 | Feldtkeller ..................... | 323/288 |
| 6,294,950 B1 | * | 9/2001 | Lee et al. ....................... | 327/539 |
| 7,123,078 B2 | * | 10/2006 | Seo ............................... | 327/536 |
| 7,180,794 B2 | * | 2/2007 | Matsue ..................... | 365/189.09 |
| 2002/0075063 A1 | * | 6/2002 | Hwang ........................ | 327/536 |
| 2003/0122610 A1 | * | 7/2003 | Zeng et al. ..................... | 327/536 |
| 2006/0197615 A1 | * | 9/2006 | Ku et al. ........................ | 331/57 |
| 2010/0033234 A1 | * | 2/2010 | Lee et al. ....................... | 327/536 |
| 2010/0052771 A1 | * | 3/2010 | Hartono ........................ | 327/536 |

FOREIGN PATENT DOCUMENTS

| | | |
|---|---|---|
| JP | 9-293376 A | 11/1997 |
| JP | 11-220872 A | 8/1999 |
| JP | 2000-173266 A | 6/2000 |
| JP | 2003-217291 A | 7/2003 |
| JP | 2004-222349 A | 8/2004 |

* cited by examiner

*Primary Examiner* — Thomas J Hiltunen
(74) *Attorney, Agent, or Firm* — Cantor Colburn LLP (57) ABSTRACT

A charge pump circuit is provided. A voltage/current conversion circuit compares a feedback voltage that corresponds to the output voltage of the charge pump circuit with a predetermined reference voltage, and generates a bias current that corresponds to the difference therebetween. An oscillator oscillates at a frequency that corresponds to the bias current. A buffer is biased by the bias current, and supplies a gate clock to the charge pump circuit based upon a clock signal output from the oscillator, thereby driving the charge pump circuit.

12 Claims, 6 Drawing Sheets

CONTROL CIRCUIT AND CONTROL METHOD FOR CHARGE PUMP CIRCUIT

BACKGROUND OF THE INVENTION

1. Field of the Invention

The present invention relates to a charge pump circuit.

2. Description of the Related Art

Battery-driven electronic devices such as cellular phones, PDAs (Personal Digital Assistants), etc., mount a circuit component which requires higher voltage than the output voltage of a battery (battery voltage). In order to supply a suitable power supply voltage to such a circuit component, a booster circuit such as a charge pump circuit, switching regulator, or the like, is employed.

In a case in which a charge pump circuit is mounted on a battery-driven electronic device, in order to drive such a device for a long time, it is desirable that the charge pump circuit and the control circuit thereof operate with reduced power consumption. Examples of such techniques which have already been proposed include: a technique in which a comparator judges whether or not the output voltage of the charge pump circuit has reached a predetermined voltage, and the frequency generated by an oscillator is switched in a stepwise manner (Patent documents 1 and 2); and a technique in which the driving capacity of a buffer for driving the charge pump is switched according to the output voltage (Patent document 2).

[Patent Document 1]
  Japanese Patent Application Laid Open No. 2000-173266
[Patent Document 2]
  Japanese Patent Application Laid Open No. 2004-222349
[Patent Document 3]
  Japanese Patent Application Laid Open No. H9-293376
[Patent Document 4]
  Japanese Patent Application Laid Open No. 2003-217291
[Patent Document 5]
  Japanese Patent Application Laid Open No. H11-220872

An arrangement in which the driving state of a charge pump circuit is switched using a comparator has a problem of increased fluctuation of the output voltage. An arrangement in which the number of comparators is increased in order to suppress the fluctuation of the output voltage has another problem of an increased circuit area.

SUMMARY OF THE INVENTION

The present invention has been made in order to solve such a problem. It is a general purpose of the present invention to provide a control circuit for a charge pump circuit, which is capable of suppressing fluctuation of the output voltage with reduced power consumption.

An embodiment of the present invention relates to a control circuit for a charge pump circuit. The control circuit includes: a voltage/current conversion circuit which compares a feedback voltage that corresponds to an output voltage of the charge pump circuit with a predetermined reference voltage, and generates a bias current that corresponds to the difference therebetween; an oscillator which oscillates at a frequency that corresponds to the bias current; and a buffer which is biased according to the bias current, and which performs a driving operation by supplying a gate clock to the charge pump circuit based upon a clock signal output from the oscillator.

Such an embodiment is capable of reducing fluctuation of the output voltage in a state in which the output voltage is stabilized at a target value. Furthermore, such an embodiment reduces power consumption by the control circuit.

Also, the voltage/current conversion circuit may include: an output terminal via which the bias current is to be output; a differential amplifier which receives the feedback voltage and the reference voltage via an inverting input terminal and a non-inverting input terminal thereof, respectively, and which is biased by a predetermined reference bias current; an output transistor and an output resistor provided in series between the output terminal and a fixed voltage terminal; and a current source which supplies an auxiliary current to the output terminal according to the reference bias current. Also, the output of the differential amplifier may be input to the control terminal of the output transistor.

Also, the voltage/current conversion circuit may include: an output terminal via which the bias current is to be output; a differential amplifier which receives the feedback voltage and the reference voltage via an inverting input terminal and a non-inverting input terminal thereof, respectively, and which is biased by the predetermined reference bias current; an output transistor and an output transistor provided in series between the output terminal and a fixed voltage terminal; and a current source which supplies a differential current, which is the difference between the reference bias current and a current that corresponds to the result of the differential amplification performed by the differential amplifier, to the output terminal. Also, the output of the differential amplifier may be input to the control terminal of the output transistor.

With each of such voltage/current conversion circuits, the output voltage can be rapidly raised. Furthermore, such an arrangement stabilizes the output voltage around the target value, as well as reducing power consumption.

Also, the voltage/current conversion circuit may reduce the bias current according to an increase in the feedback voltage in a range in which the feedback voltage is smaller than the reference voltage.

Also, in a range in which the feedback voltage is smaller than the reference voltage, the absolute value of the rate of change of the bias current with respect to the feedback voltage may be increased according to an increase in the feedback voltage.

(1) In a first range in which the feedback voltage is a smallest value, the absolute value of the rate of change of the bias current with respect to the feedback voltage may be set to a first value which is approximately constant over this range.

(2) In a second range in which the feedback voltage is greater than the first range, the absolute value of the rate of change of the bias current with respect to the feedback voltage may be set to a second value which is approximately constant over this range and which is greater than the first value.

(3) In a third range in which the feedback voltage is greater than the second range and is smaller than the reference voltage, the absolute value of the rate of change of the bias current with respect to the feedback voltage may be set to a third value which is approximately constant over this range and which is greater than the second value.

Another embodiment of the present invention relates to a power supply circuit. The power supply circuit includes: a charge pump circuit; and any one of the above-described control circuits, which supplies a clock signal to the charge pump circuit so as to drive the charge pump circuit.

Yet another embodiment of the present invention relates to a control method for a charge pump circuit. The control method includes: comparing a feedback voltage that corresponds to an output voltage of the charge pump circuit with a predetermined reference voltage, and generating a bias current that corresponds to the difference therebetween; generating a clock signal with a frequency that corresponds to the bias current; and driving the charge pump circuit by supplying a gate clock to the charge pump circuit based upon the clock signal, using a buffer biased according to the bias current.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
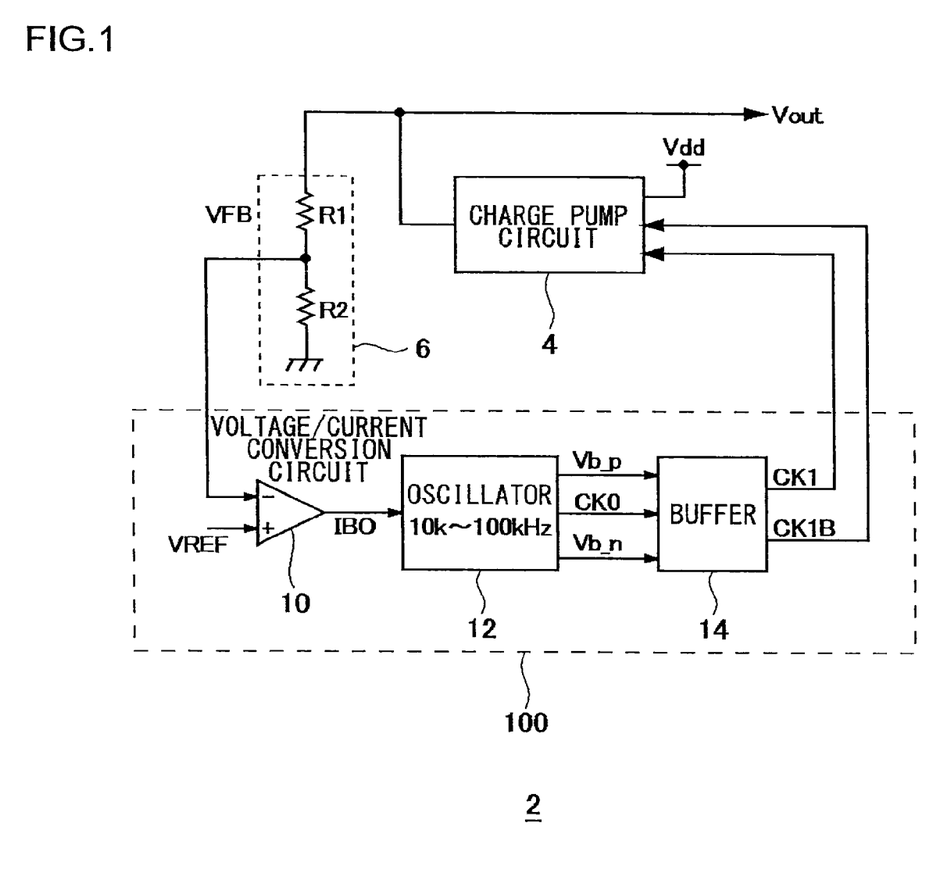
FIG. 1 is a block diagram which shows a configuration of a power supply circuit according to an embodiment.

FIG. 1 is a block diagram which shows a configuration of a power supply circuit 2 according to an embodiment. The power supply circuit 2 includes a charge pump circuit 4, a voltage divider circuit 6, and a control circuit 100.

The control circuit 100 is driven by supplying a gate clock CK1 and an inverted gate clock CK1B to the charge pump circuit 4. The charge pump circuit 4 boosts the power supply voltage Vdd with a predetermined step-up ratio, and outputs the output voltage Vout. The output voltage Vout is supplied to an unshown load. The voltage divider circuit 6 includes resistors R1 and R2, and divides the output voltage Vout so as to output a feedback voltage VFB according to the output voltage Vout.

The control circuit 100 includes a voltage/current conversion circuit 10, an oscillator 12, and a buffer 14.

The voltage/current conversion circuit 10 compares the feedback voltage VFB with a predetermined reference voltage VREF, and generates a bias current Ib that corresponds to the difference therebetween. The reference voltage VREF is determined according to the target value of the output voltage Vout.

The oscillator 12 oscillates at a frequency that corresponds to the bias current Ib, and outputs a clock signal CK0 to the buffer 14.

The buffer 14 is biased by the bias current Ib such that the driving capacity (current supply capacity) can be adjusted.

The buffer 14 generates the gate clocks CK1 and CK1B synchronously with the clock signal CK0 output from the oscillator 12, thereby driving the charge pump circuit 4.

Figure 2A:
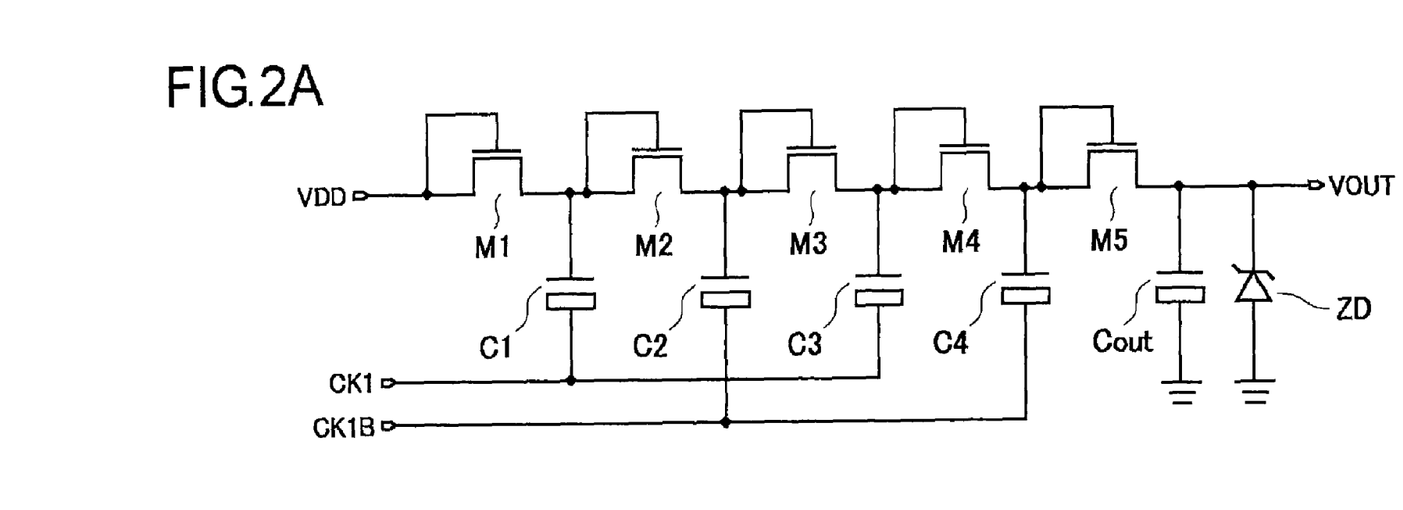
FIGS. 2A and 2B are circuit diagrams which show the configurations of charge pump circuits.
Figure 2B:
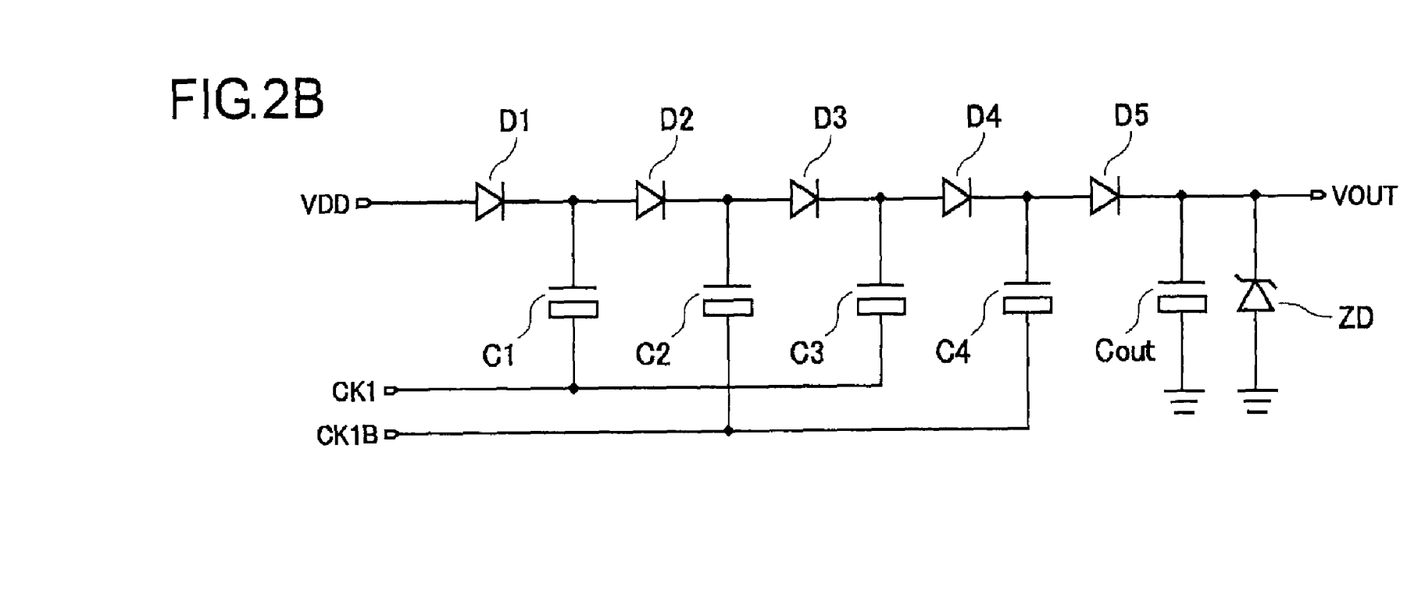

FIG. 2A and FIG. 2B are circuit diagrams which show configurations of the charge pump circuit 4. The charge pump circuit 4 shown in FIG. 2A includes: an input terminal P1 via which the power supply voltage Vdd is to be input; an output terminal P2 via which the output voltage Vout is to be output; multiple transistors M1 through M5; multiple capacitors C1 through C4; an output capacitor Cout; and a Zener diode ZD.

The multiple transistors M1 through M5 are connected in series between the input terminal P1 and the output terminal P2. Each of the transistors M1 through M5 is a MOSFET (Metal Oxide Semiconductor Field Effect Transistor), each of which is arranged with the gate connected to one terminal thereof. One terminal of the i'th capacitor Ci is connected to the other terminal of the corresponding transistor Mi. Each of the transistors M1 through M5 provides a function as a rectifier component.

The gate clock CK1 generated by the buffer 14 is supplied to the other terminal of each odd-numbered capacitor C. The inverted gate clock CK1B generated by the buffer 14 is supplied to the other terminal of each even-numbered capacitor C. The output capacitor Cout is provided between the output terminal P2 and the ground terminal. The Zener diode ZD is provided for stabilizing the output voltage Vout. The charge pump circuit 4 boosts the power supply voltage Vdd with a set-up ratio that corresponds to the number of transistors M.

The charge pump circuit 4 shown in FIG. 2B has a configuration in which the transistors M1 through M5 are replaced by the diodes D1 through D5.

Figure 3:
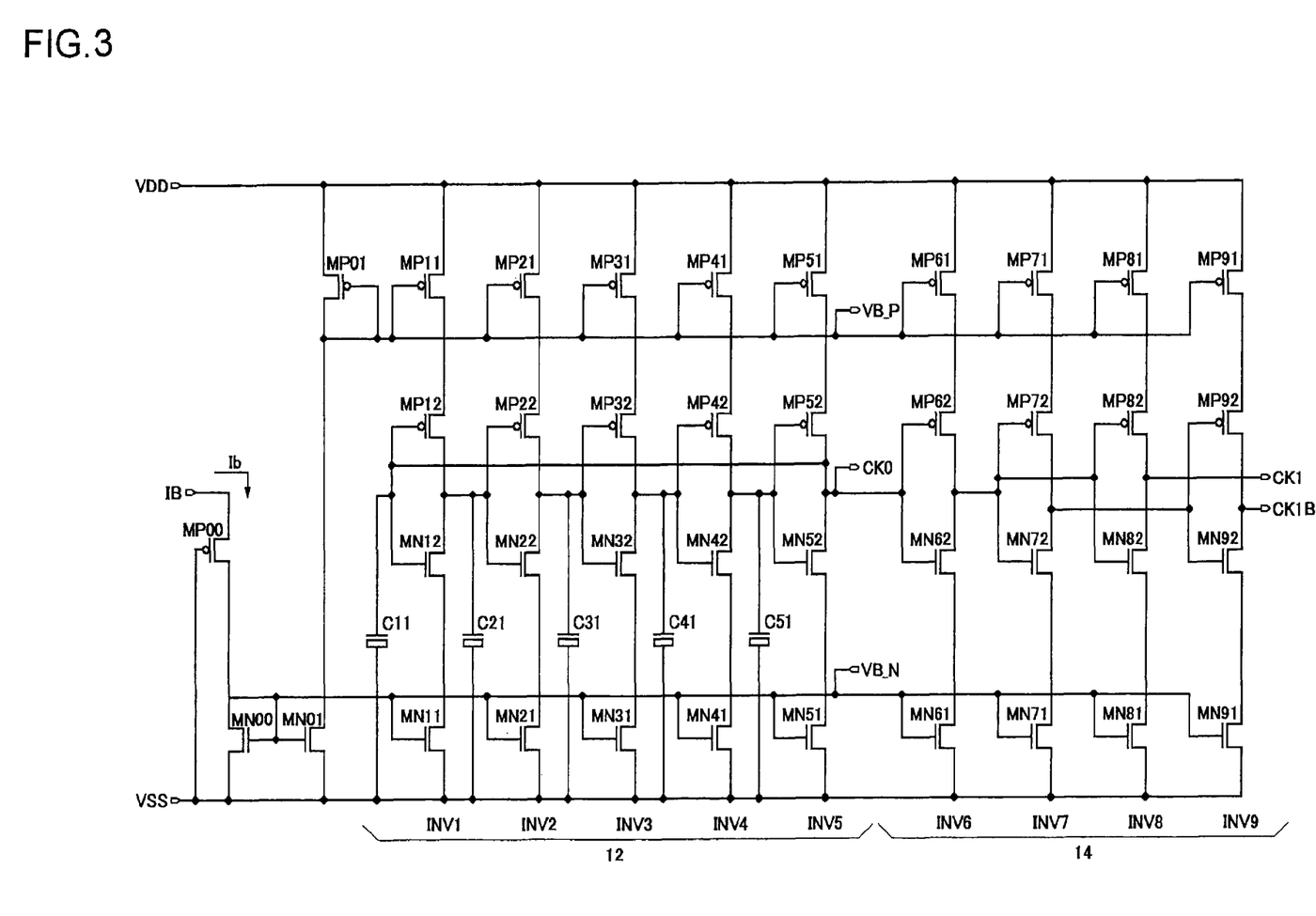
FIG. 3 is a circuit diagram which shows the configuration of an oscillator and a buffer.

FIG. 3 is a circuit diagram which shows a configuration of the oscillator 12 and the buffer 14. The oscillator 12 includes five inverters INV1 through INV5 connected in the form of rings. Capacitors C11 through C41, each of which is used to adjust the delay amount for a corresponding inverter stage, are provided to the connection nodes that connect the adjacent inverters. A desired number of inverters INV may be provided.

The i'th inverter INVi includes four transistors MPi1, MPi2, MNi2, and MNi1, connected in series between the power supply terminal VDD and the ground terminal VSS. The transistors MPi1 and MNi2 are biased such that a current flows therethrough in proportion to the bias current Ib supplied to the bias terminal IB. The oscillation frequency of the oscillator 12 is increased according to an increase in the bias current Ib. In other words, the oscillation frequency is reduced according to a reduction in the bias current Ib.

The buffer 14 includes four inverters INV6 through INV9 connected in cascade. Each inverter INV has the same configuration as that of each of the inverters which are components of the oscillator 12. The first inverter included in the buffer 14 receives the clock signal CK0 output from the oscillator 12 as an input signal. The gate clock CK1 is generated by the first and third inverters INV6 and INV8. The inverted gate clock CK1B is output by the first, second, and fourth inverters INV6, INV7, and INV9.

The configuration of the oscillator 12 and the buffer 14 is not restricted to that shown in FIG. 3. For example, description will be made below regarding a modification.

The oscillator 12 may output the clock signal CK0 and the inverted clock signal CK0B. The inverted clock signal CK0 can be obtained from the output of the even-numbered inverter INV4. With such an arrangement, the inverted clock signal CK0B obtained from the oscillator 12 may be input to the second inverter INV included in the buffer 14.

Figure 4A:
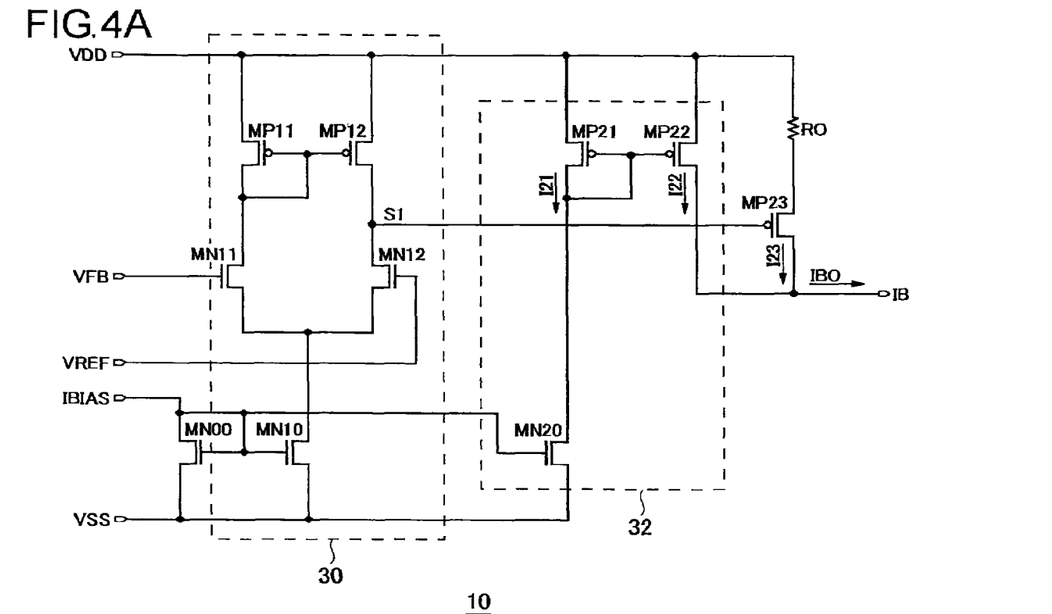
FIGS. 4A and 4B are circuit diagrams which show the example configurations of voltage/current conversion circuits.
Figure 4B:
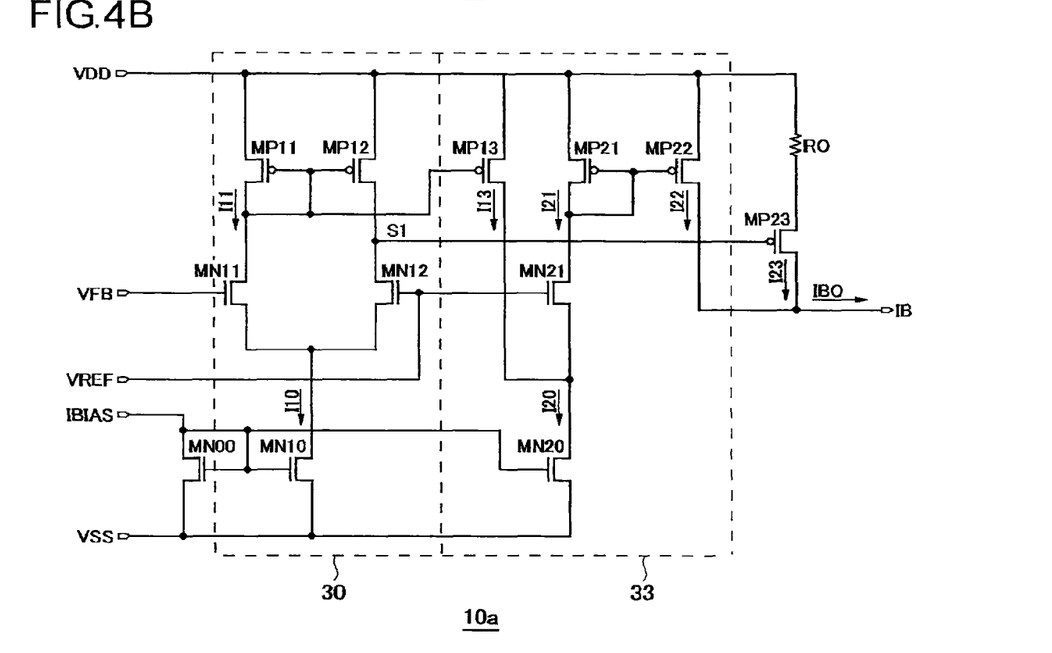

FIG. 4A and FIG. 4B are circuit diagrams which show example configurations of the voltage/current conversion circuit 10.

The voltage/current conversion circuit 10 shown in FIG. 4A includes a differential amplifier 30, an output transistor MP23, an output resistor R0, and a current source 32. An output terminal IB is provided for outputting a bias current IBO. The differential amplifier 30 receives the feedback voltage VFB and the reference voltage VREF via the inverting input terminal and the non-inverting input terminal thereof, respectively. The transistor MN10 generates a tail current I10 according to a predetermined bias current IBIAS.

The output transistor MP23 and the output resistor R0 are provided in series between the output terminal IB and a fixed voltage terminal (power supply terminal) VDD. An output signal S1 of the differential amplifier 30 is input to a control terminal (gate) of the output transistor MP23.

The current source 32 supplies an auxiliary current I22 to the output terminal IB according to the reference bias current IBIAS. The bias voltage IBO obtained by combining the current I23 that flows through the output transistor MP23 and the auxiliary current I22 is output via the output terminal IB, and the bias voltage IBO is supplied to the downstream components, i.e., the oscillator 12 and the buffer 14.

The voltage/current conversion circuit 10a shown in FIG. 4B includes a differential amplifier 30, a current source 33, an output resistor R0, and an output transistor MP23.

A first current I20 that corresponds to the reference bias current IBIAS flows through a transistor MN20 included in the current source 33. A current I13 flows through a transistor MP13 according to the result of the differential amplification by the differential amplifier 30. That is to say, the current I13 flows through the transistor MP13 according to a current I11 that flows through a differential transistor MN11. A transistor MP21 is provided on a path for a differential current I21 (I20-I30) which is the difference between the current I20 and the current I13. The control terminal (gate) of the transistor MP21 is biased by a reference voltage VREF. The current source 33 supplies a current I22 to an output terminal IB according to the differential current I21. A bias current IBO obtained by combining a current I23 that flows through the output transistor MP23 and the current I22 is output via the output terminal IB, and the bias current IBO thus output is supplied to the oscillator 12 and the buffer 14, which are downstream components.

Figure 5:
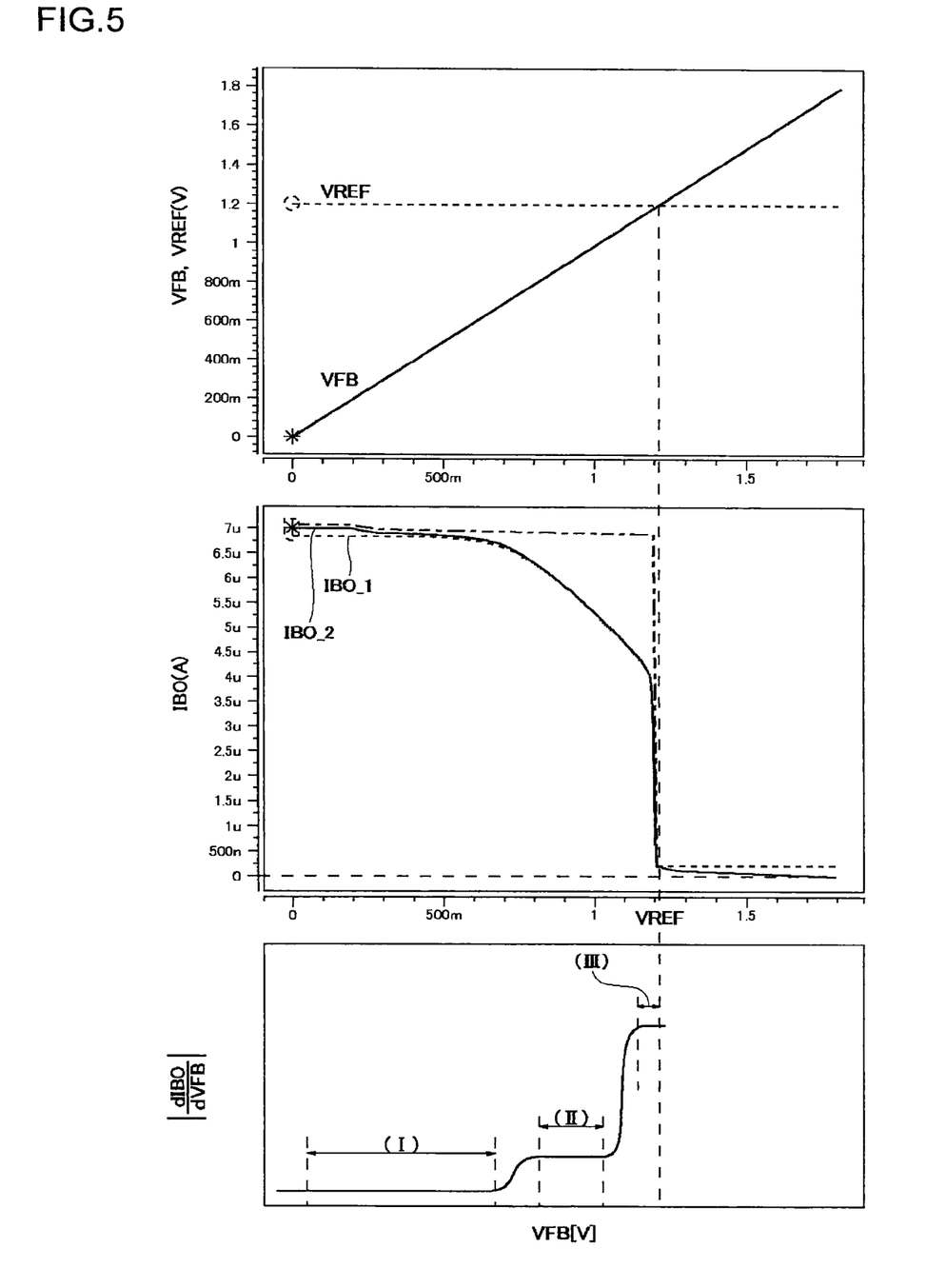
FIG. 5 is a diagram which shows the relation between a feedback voltage and a bias voltage in the voltage/current conversion circuits shown in FIGS. 4A and 4B.

FIG. 5 is a diagram which shows the relation between the feedback voltage and the bias current in each of the voltage/current conversion circuits shown in FIG. 4A and FIG. 4B. The upper graph shows the feedback voltage VFB and the reference voltage VREF. The middle graph shows the feedback current IFB. The lower graph shows the absolute value of the change (i.e., the differential value) of the feedback current IFB with respect to the feedback voltage VFB.

In the upper, middle, and lower graphs, the horizontal axis represents the bias voltage VFB. The broken line in the middle graph represents the bias current IBO_1 generated by the voltage/current conversion circuit 10 shown in FIG. 4A. The solid line in the middle graph represents the bias current IBO_2 generated by the voltage/current conversion circuit 10a shown in FIG. 4B.

The bias current IBO generated by each of the voltage/current conversion circuits shown in FIG. 4A and FIG. 4B has the following features.

The bias current IBO is continuously reduced in the region in which the feedback voltage VFB is lower than the reference voltage VREF.

That is to say, when the feedback voltage VFB is set to the minimum value, the bias current IBO exhibits the maximum value. Furthermore, the bias current IBO is reduced as the feedback voltage VFB approaches the reference voltage VREF. Accordingly, when the output voltage Vout is small immediately after the driving operation of the charge pump circuit 4 is started, the oscillator 12 operates at a high frequency, thereby increasing the driving capacity of the buffer 14. Thus, such an arrangement is capable of raising the output voltage in a short period of time. As the output voltage Vout approaches the target value, the operating frequency of the oscillator 12 is reduced, which reduces the driving capacity of the buffer 14, thereby reducing power consumption.

With a conventional technique employing a comparator, the bias current IBO changes substantially in a discontinuous manner. Accordingly, the charge pump circuit 4 is alternately and repeatedly switched between the operating state and the non-operating state. In this case, ripples occur in the output voltage Vout. On the other hand, with the present embodiment employing the voltage/current conversion circuit, the bias current IBO is continuously changed. Thus, such an arrangement prevents ripples from occurring in the output voltage Vout, thereby stabilizing the output voltage Vout around the target value.

As shown in the lower graph in FIG. 5, the absolute value of the rate of change of the bias current IBO with respect to the feedback voltage VFB is set to an increased value according to an increase in the feedback voltage VFB in the region in which the feedback voltage VFB is smaller than the reference voltage VREF.

The absolute value of the rate of change of the bias current IBO with respect to the feedback voltage VFB can be classified into the following three regions.

(1) In a first region (I) in which the feedback voltage VFB is set to a smallest-value range, the absolute value of the rate of change of the bias current IBO with respect to the feedback voltage VFB is set to a first value which is approximately constant over the first region (I).

(2) In a second region (II) in which the feedback voltage VFB therein is greater than that in the first region (I), the absolute value of the rate of change of the bias current IBO with respect to the feedback voltage VFB is set to a second value which is greater than the first value, and which is approximately constant over the second region (II).

(3) In a third region (III) in which the feedback voltage VFB therein is greater than that in the second region (II) and is smaller than the reference voltage VREF, the absolute value of the rate of change of the bias current IBO with respect to the feedback voltage VFB is set to a third value which is greater than the second value, and which is approximately constant over the third region (III).

Figure 6:
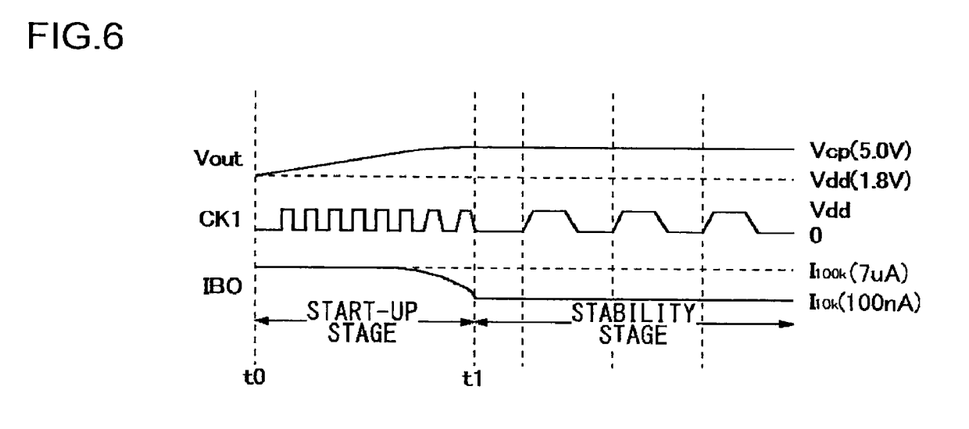
FIG. 6 is a time chart which shows the operation of the power supply circuit shown in FIG. 1.

The above is the configuration of the control circuit 100 according to the embodiment. Next, description will be made regarding the operation thereof. FIG. 6 is a time chart which shows the operation of the power supply circuit 2 shown in FIG. 1. At the point in time t0, the control circuit 100 is instructed to start to drive the charge pump circuit 4. During a period between the points in time t0 through t1, the output voltage Vout rapidly rises up to the target value Vcp (=5 V). As the output voltage Vout rises, the bias current IBO is reduced. After the output voltage Vout reaches the target value, the charge pump circuit 4 enters the stable state. In the stable state, the charge pump circuit 4 is driven at a very low frequency and with very small driving capacity. As a result, such an arrangement is capable of supplying reduced power consumption, as well as a stable output voltage Vout.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a charge pump circuit including:
   a voltage/current conversion circuit which compares a feedback voltage that corresponds to an output voltage of the charge pump circuit with a predetermined reference voltage, and generates a bias current that corresponds to the difference therebetween;
   an oscillator which oscillates at a frequency that corresponds to the bias current; and
   a buffer which is biased according to the bias current, and which performs a driving operation by supplying a gate clock to the charge pump circuit based upon a clock signal output from the oscillator, wherein the voltage/current conversion circuit includes:
   an output terminal via which the bias current is to be output;
   a differential amplifier which receives the feedback voltage and the reference voltage via an inverting input terminal and a non-inverting input terminal thereof, respectively, and which is biased by a predetermined reference bias current;
   an output transistor and an output resistor provided in series between the output terminal and a fixed voltage terminal; and
   a current source which supplies an auxiliary current to the output terminal according to the reference bias current,
   and wherein the output of the differential amplifier is input to the control terminal of the output transistor.

2. A control circuit according to claim 1, wherein the voltage/current conversion circuit reduces the bias current according to an increase in the feedback voltage in a range in which the feedback voltage is smaller than the reference voltage.

3. A control circuit according to claim 2, wherein, in a range in which the feedback voltage is smaller than the reference voltage, the absolute value of the rate of change of the bias current with respect to the feedback voltage is increased according to an increase in the feedback voltage.

4. A control circuit according to claim 2, wherein, in a first range in which the feedback voltage is a smallest value, the absolute value of the rate of change of the bias current with respect to the feedback voltage is set to a first value which is approximately constant over this range,
   and wherein, in a second range in which the feedback voltage is greater than the first range, the absolute value of the rate of change of the bias current with respect to the feedback voltage is set to a second value which is approximately constant over this range and which is greater than the first value,
   and wherein, in a third range in which the feedback voltage is greater than the second range and is smaller than the reference voltage, the absolute value of the rate of change of the bias current with respect to the feedback voltage is set to a third value which is approximately constant over this range and which is greater than the second value.

5. A power supply circuit including:
   a charge pump circuit; and
   a control circuit which supplies a clock signal to the charge pump circuit so as to drive the charge pump circuit, wherein the control circuit comprises:
   a voltage/current conversion circuit which compares a feedback voltage that corresponds to an output voltage of the charge pump circuit with a predetermined reference voltage, and generates a bias current that corresponds to the difference therebetween;
   an oscillator which oscillates at a frequency that corresponds to the bias current; and
   a buffer which is biased according to the bias current, and which performs a driving operation by supplying a gate clock to the charge pump circuit based upon a clock signal output from the oscillator, wherein the voltage/current conversion circuit includes:
   an output terminal via which the bias current is to be output;
   a differential amplifier which receives the feedback voltage and the reference voltage via an inverting input terminal and a non-inverting input terminal thereof, respectively, and which is biased by a predetermined reference bias current;
   an output transistor and an output resistor provided in series between the output terminal and a fixed voltage terminal; and
   a current source which supplies an auxiliary current to the output terminal according to the reference bias current,
   and wherein the output of the differential amplifier is input to the control terminal of the output transistor.

6. A control method for a charge pump circuit including:
   comparing a feedback voltage that corresponds to an output voltage of the charge pump circuit with a predetermined reference voltage, and generating a bias current that corresponds to the difference therebetween by the voltage/current conversion circuit;
   generating a clock signal with a frequency that corresponds to the bias current; and
   driving the charge pump circuit by supplying a gate clock to the charge pump circuit based upon the clock signal, using a buffer biased according to the bias current, wherein the voltage/current conversion circuit comprises:
   an output terminal via which the bias current is to be output;
   a differential amplifier which receives the feedback voltage and the reference voltage via an inverting input terminal and a non-inverting input terminal thereof, respectively, and which is biased by a predetermined reference bias current;
   an output transistor and an output resistor provided in series between the output terminal and a fixed voltage terminal; and
   a current source which supplies an auxiliary current to the output terminal according to the reference bias current,
   and wherein the output of the differential amplifier is input to the control terminal of the output transistor.

7. A control circuit for a charge pump circuit including:
   a voltage/current conversion circuit which compares a feedback voltage that corresponds to an output voltage of the charge pump circuit with a predetermined reference voltage, and generates a bias current that corresponds to the difference therebetween;
   an oscillator which oscillates at a frequency that corresponds to the bias current; and
   a buffer which is biased according to the bias current, and which performs a driving operation by supplying a gate clock to the charge pump circuit based upon a clock signal output from the oscillator, wherein the voltage/current conversion circuit includes:

an output terminal via which the bias current is to be output;

a differential amplifier which receives the feedback voltage and the reference voltage via an inverting input terminal and a non-inverting input terminal thereof, respectively, and which is biased by the predetermined reference bias current;

an output transistor and an output resistor provided in series between the output terminal and a fixed voltage terminal; and a current source which supplies a differential current, which is the difference between the reference bias current and a current that corresponds to the result of the differential amplification performed by the differential amplifier, to the output terminal, and wherein the output of the differential amplifier is input to the control terminal of the output transistor.

8. A control circuit according to claim 7, wherein the voltage/current conversion circuit reduces the bias current according to an increase in the feedback voltage in a range in which the feedback voltage is smaller than the reference voltage.

9. A control circuit according to claim 8, wherein, in a range in which the feedback voltage is smaller than the reference voltage, the absolute value of the rate of change of the bias current with respect to the feedback voltage is increased according to an increase in the feedback voltage.

10. A control circuit according to claim 8, wherein, in a first range in which the feedback voltage is a smallest value, the absolute value of the rate of change of the bias current with respect to the feedback voltage is set to a first value which is approximately constant over this range, and wherein, in a second range in which the feedback voltage is greater than the first range, the absolute value of the rate of change of the bias current with respect to the feedback voltage is set to a second value which is approximately constant over this range and which is greater than the first value, and wherein, in a third range in which the feedback voltage is greater than the second range and is smaller than the reference voltage, the absolute value of the rate of change of the bias current with respect to the feedback voltage is set to a third value which is approximately constant over this range and which is greater than the second value.

11. A power supply circuit including:

a charge pump circuit; and a control circuit which supplies a clock signal to the charge pump circuit so as to drive the charge pump circuit, wherein the control circuit comprises:

a voltage/current conversion circuit which compares a feedback voltage that corresponds to an output voltage of the charge pump circuit with a predetermined reference voltage, and generates a bias current that corresponds to the difference therebetween;

an oscillator which oscillates at a frequency that corresponds to the bias current; and a buffer which is biased according to the bias current, and which performs a driving operation by supplying a gate clock to the charge pump circuit based upon a clock signal output from the oscillator, wherein the voltage/current conversion circuit includes:

an output terminal via which the bias current is to be output;

a differential amplifier which receives the feedback voltage and the reference voltage via an inverting input terminal and a non-inverting input terminal thereof, respectively, and which is biased by the predetermined reference bias current;

an output transistor and an output resistor provided in series between the output terminal and a fixed voltage terminal; and a current source which supplies a differential current, which is the difference between the reference bias current and a current that corresponds to the result of the differential amplification performed by the differential amplifier, to the output terminal, and wherein the output of the differential amplifier is input to the control terminal of the output transistor.

12. A control method for a charge pump circuit including:

comparing a feedback voltage that corresponds to an output voltage of the charge pump circuit with a predetermined reference voltage, and generating a bias current that corresponds to the difference therebetween by the voltage/current conversion circuit;

generating a clock signal with a frequency that corresponds to the bias current; and driving the charge pump circuit by supplying a gate clock to the charge pump circuit based upon the clock signal, using a buffer biased according to the bias current, wherein the voltage/current conversion circuit includes:

an output terminal via which the bias current is to be output;

a differential amplifier which receives the feedback voltage and the reference voltage via an inverting input terminal and a non-inverting input terminal thereof, respectively, and which is biased by the predetermined reference bias current;

an output transistor and an output resistor provided in series between the output terminal and a fixed voltage terminal; and a current source which supplies a differential current, which is the difference between the reference bias current and a current that corresponds to the result of the differential amplification performed by the differential amplifier, to the output terminal, and wherein the output of the differential amplifier is input to the control terminal of the output transistor.

* * * * *